United States Patent [19]

Brown et al.

[11] Patent Number: 5,093,487
[45] Date of Patent: Mar. 3, 1992

[54] LOW VISCOSITY HIGH MOLECULAR WEIGHT FILTER STERILIZABLE HYALURONIC ACID

[75] Inventors: Karen K. Brown, Kansas City, Mo.; Nathan D. Greene, Leawood, Kans.; Sandy L. Trump, DeSoto, Kans.; Sharon A. Bryant, Shawnee, Kans.

[73] Assignee: Mobay Corporation, Pittsburgh, Pa.

[21] Appl. No.: 816,548

[22] Filed: Jan. 6, 1986

[51] Int. Cl.$^5$ .............................................. C07H 5/04
[52] U.S. Cl. .................................. 536/55.1; 536/124; 536/127
[58] Field of Search ......................... 536/55.1, 1.1

[56] References Cited

U.S. PATENT DOCUMENTS

| | | | |
|---|---|---|---|
| 2,975,104 | 3/1961 | Warren | 195/28 |
| 3,396,081 | 8/1968 | Billck | 195/7 |
| 4,141,973 | 2/1979 | Balazs | 424/180 |
| 4,517,295 | 5/1985 | Bracke | 435/101 |

FOREIGN PATENT DOCUMENTS

| | | | |
|---|---|---|---|
| 143393 | 6/1985 | European Pat. Off. | |
| 144019 | 6/1985 | European Pat. Off. | |
| 8037001 | 3/1983 | Japan | 536/55.1 |
| WO86/04355 | 7/1986 | PCT Int'l Appl. | |

OTHER PUBLICATIONS

Clark et al., "Experimental Biochemistry", 1977, Freeman and Co., pp. 230-231.

Fujiwa et al., Chemical Abstracts, vol. 105, 1986, No. 227738y.

Laurent et al., Chemical Abstracts, vol. 98, 1983, No. 211815f.

A. Mitra, S. Raghunathan, J. Sheehan and Struther Arnott, 1983, pp. 829-859, "Hyaluronic Acid: Molecular Conformations and Interactions in the Orthorhombic and Tetragonal Forms Containing Sinuous Chains".

Primary Examiner—Johnnie R. Brown
Assistant Examiner—Elli Peselev
Attorney, Agent, or Firm—Joseph C. Gil; Lyndanne M. Whalen

[57] ABSTRACT

The present disclosure is concerned with procedures for adjusting the average molecular weight, the molecular weight distribution and the viscosity in solution of hyaluronic acid and its salts (HA), particularly its sodium and potassium salts. The average molecular weight can be increased and the molecular weight distribution can be narrowed by precipitating this material into a bath of a non-solvent containing a continuously moving device to which it can adhere as it precipitates. The solution viscosity of this or any high molecular weight, high viscosity HA can be reduced without substantially effecting its molecular weight by either a moderate temperature heat treatment or passage through a fine (one micron or less) pore filter as a one weight percent or stronger aqueous solution. The disclosure is also concerned with the high molecular weight low solution viscosity HA so obtained.

23 Claims, No Drawings

LOW VISCOSITY HIGH MOLECULAR WEIGHT FILTER STERILIZABLE HYALURONIC ACID

BACKGROUND OF THE INVENTION

The advantages of using hyaluronic acid and its salts (HA) as an eye or joint fluid replacement are well known. See for example, U.S. Pat. No. 4,141,973 to Balazs, and U.S. Pat. No. 4,517,795 to Bracke et al and U.S. Pat. No. 2,975,104 to Warren. See also copending patent application Ser. No. 555,224 and Ser. No. 555,310 both filed Nov. 25, 1983. Most uses for hyaluronic acid or its salts require high molecular weight polymer. HA products such as Hylartil (Pharmacia as per Balazs) have a high molecular weight but they are also highly viscous. Such a viscous product might be ideal for some uses (i.e. reduction of adhesion formation post surgery); however, HA for injection should preferably be of low viscosity and filterable especially filter sterilizable. Some new extraction processes produce low viscosity HA but it is also of low molecular weight (Sterivet product, Bracke, U.S. Pat. No. 4,517,195, and Shimada and Matsumura, 1975). Obviously, this has some advantage for injectability but its low molecular weight requires use of larger doses (5.0 ml of Sterivet vs. 2.0 ml of Pharmacia product). Also, the Sterivet HA is not filter sterilizable and must be heat sterilized.

To our knowledge, no one has described procedures to obtain high molecular weight HA from low molecular weight HA. However, a method of lowering viscosity by adjusting pH has been described in the literature (Mitra et al, 1983; Mitra, Raghunathan et al, 1983 and Sheehan et al, 1983). These groups do not discuss molecular weight but relate this reversible pH phenomenon to a conformational change in the HA molecule. They have theorized that the lowered viscosity is probably due to an increased flexibility of the polymer which may be the result of an order-to-disorder transition. This suggests instability of polymer and eventually lowered molecular weight. Swann (1969) proposed that the loss of viscosity may be due to the ionization of hydroxyl groups and the disruption of interresidue hydrogen bonding within the random coil of the $\alpha$-helix structure of Ha. Interestingly, this viscosity-reducing phenomenon resulting from high pH can be totally reversed by dropping the pH below 3.0. In fact, at pH approximately 2.5 a viscoelastic putty is produced (Gibbs et al, 1968). It is also of interest that the high pH low viscosity HA is quite difficult to filter sterilize. A gel layer builds up in front of the filter making large volume filtration essentially impossible.

SUMMARY OF THE INVENTION

We have now found relatively simple and new techniques for producing high molecular weight HA (conveniently in the form of sodium hyaluronate, NaH) with high viscosity and reducing HA viscosity without lowering the desired high average molecular weight. The resulting HA product is characterized by high average molecular weight (preferably greater than about $1.2 \times 10^6$) with a narrow molecular weight range (see copending patent application Ser. No. 555,224 filed 11/25/83), low viscosity (preferably less than about 500 c/s in a 1% by weight solution at 37° C.), ultra high purity ($<1.25$, preferably $<0.1$ mg/ml protein or amino acids as measured by HPLC or UV spectrophotometry and $<45$ preferably $<5.0$ g/ml nucleic acids as measured by the same techniques), light stability, heat stability, and ready aminability to filter sterilization.

DETAILED DESCRIPTION OF THE INVENTION

A low viscosity HA which still has a high molecular weight with a narrow molecular weight range may be obtained by either a controlled heat treatment of the HA solution or filtration of a minimum concentration solution with high pressure or vacuum through small-pore membranes. Quite surprisingly, these viscosity reducing techniques are not directly reversible as is the pH technique previously described and they do not reduce the molecular weight of the HA in conjunction with reduction in viscosity. In addition, the viscosity-lowering techniques described herein allow the final product HA to be filter sterilized whereas use of pH to lower viscosity does not produce a filterable product. The HA obtainable according to copending U.S. patent application Ser. No. 555,224 is of high molecular weight and has a fairly narrow molecular weight distribution. However, as a one weight percent aqueous solution it typically has 37° C. viscosities in excess of about 500 centistokes. This viscosity is much too high to allow filtration through the 0.22 micron pore size filter required for sterilization under the mild conditions desired by the art, e.g. less than about 5 psi overpressure or the equivalent vacuum.

The heat-related viscosity reducing technique is directly proportional to time and temperature. The longer the heat treatment at a constant temperature (preferably in the range of 50° C. to 70° C.) the lower will be the viscosity. Increase in temperature to around 121° C. will reduce viscosity in a shorter time period. However, too high a temperature for too long a time ($<121°$ C. for $<60$ minutes) results in caramelization and some hydrolysis which relates to an unwanted reduction in molecular weight. In using the filtration technique, the small pore membrane used should have an average pore size of less than about 1.0 micron, preferably less than about 0.5 micron.

The HA of the examples below was made in commercial size batches in accordance with the directions of copending patent application Ser. No. 555,224 with the omission of the $\beta$-propiolactone sterilization and, for the HA reported on in Tables 1 and 3, with the addition of the winding technique at each precipitation. A very important aspect of our HA product is that it has a relatively high molecular weight (e.g. at least about 1,000,000, preferably at least 1,800,000) and an artificially produced viscosity (e.g. less than about 500, preferably less than about 150 centistokes as a 1% aqueous sodium salt solution). Our two methods of lowering viscosity without substantially lowering high average molecular weight are illustrated in the examples and tables below (in which molecular weight is by FPLC and viscosity is of a one weight percent aqueous 37° C. solution of NaH unless otherwise indicated).

A process which results in increased molecular weight and viscosity of HA involves use of a continuously moving device immersed in a bath of non-solvent for HA or NaH to which precipitating HA or NaH will adhere. A preferred specific winding apparatus, herein called a "winder", imparts a rotational shear to the liquid medium into which the HA is precipitated and provides a moving substrate to which the precipitating HA can attach. The winder is constructed of stainless steel rods or bars, arranged in a vertical orientation, and is mounted on a rotating shaft. A vertical shaft is preferred. The shaft is rotated by a motor, the speed of which can be controlled. The exact size and configuration of the winder can vary according to the size of the container and the amount of HA to be collected. A cage-like configuration consisting of a rotating wire mesh cylinder is preferred. Using this winder the method of production of high molecular weight and high viscosity HA is as described below.

The solution of sodium hyaluronate is delivered into a container of a non-solvent, preferably ethanol, in a fine stream, or multiple streams. Upon contact with the non-solvent the product is immediately saturated with the non-solvent and therefore precipitated in long strings. These strings are maintained in motion by the rotation of the winding apparatus, which, in turn, imparts a rotating motion to the non-solvent in the container. Upon contact of the precipitated string of insoluble sodium hyaluronate with the "fingers" or vertical rods of the winder, the precipitate becomes attached. Since the product tends to adhere to itself, and to most surfaces, it then accumulates on the winder. It is thought that this adherence to itself produces longer polymers which form numerous interresidue hydrogen bonds which in turn result in a higher molecular weight and viscosity. By using a container which can be drained from the bottom, it is then possible to remove the now diluted non-solvent from the container and to introduce a solution of water or buffer as desired. The precipitated product can thus be resolubilized in the container without further handling. It should be noted that Bracke teaches away from a procedure such as this. Bracke repeatedly emphasizes the fact that the ethanol-HA solution should not be stirred or mixed.

Heat Treatment Method: Tables 1-3 demonstrate the effect of heat on viscosity. All viscosities were measured by a Cannon-Manning Semi-Micro Viscometer using the procedure described in ASTM D445 and D2515 at 37° C. and are recorded in centistokes (c/s). Molecular weight was determined via gel filtration (Heftmann, Chromatography) using a Fast Protein Liquid Chromatograph (FPLC) and a TSK HW 65F or TSK HW 75F column according to the following procedure:

DETERMINATION OF WEIGHT AVERAGE MOLECULAR WEIGHT ($M_w$) FOR SODIUM HYALURONATE 1.0 Purpose
To provide a liquid chromatography method with which to estimate an average weight for the Sodium Hyaluoronate molecule in relation to known standard molecular weight averages.

2.0 Scope
Applicable to all in-process raw materials and/or finished product samples of Sodium Hyaluronate.

3.0 Principles
Gel Filtration (Size Exclusion Chromatography) can determine molecular weight information by comparing analyte peak elution volumes to a standard curve prepared from analysis of substances similar in molecular shape and density which also have a known molecular weight average. To be effective, the standard curve should be prepared from a range of molecular size standards within which the analyte of interest will fall.

4.0 Procedure
4.1 Instrument Parameters

Column—Fractogel TSK HW 65F (EM Sciences)
Fractionation range=50,000-5,000,000 MW (globular species)
Column Size—50 cm±2 cm×1.6 cm ID gel bed
Mobile Phase—PBS-P (Formula attached) 0.22μ Filtered (150 ml/injection)
Flow Rate—2 ml/min
Chart Speed—0.20 cm/min
Detector Sensitivity—4×0.05 (ISCO V4)
Wavelength—205 nm
Controller—LCC 500 (Pharmacia) programmed to operate the column in accordance with the specified instrument parameters.
Injection Volume—1000 μl
Temperature—the column must be kept at a constant temperature with room temperature being most convenient. The constancy of the base line is adversely affected if the temperature varies during a run and only runs at the same temperature are readily compatible.

Allow column to stabilize with mobile phase until a steady baseline is reached.

4.2 Standard Curve Preparation
4.2.a. Reagents
Mobile Phase
Thyroglobulin (Sigma #T-1001) 669,000 $M_w$—or equivalent and Blue Dextran (Pharmacia #17-0360-01) 2,000,000 $M_w$—or equivalent.

4.2.b. Standards
Prepare a stock solution of Thyoglobulin by weighing 0.006 gm into a 25 ml volumetric flask. Dilute to the mark with mobile phase. Allow to dissolve completely, shake intermittently to mix. Pipet 10 ml of stock solution into a 20 ml volumetric flask. Dilute to the mark with mobile phase. The resulting solution equals 125 micrograms/ml of Thyroglobulin.

4.2.c. Prepare a stock solution of Blue Dextran by weighing 0.08 gm into a 20 ml volumetric flask. Dilute to the mark with mobile phase. Allow to dissolve completely, shake intermittently to mix. Pipet 5 ml of stock solution into another 20 ml volumetric flask. Dilute to the mark with mobile phase. The resulting solution equals 1000 micrograms/ml of Blue Dextran.

Both stock solutions are stable for 30 days, refrigerated. Prepare working solutions fresh daily from the stock. Filter both working solutions through a 0.22μ Filter prior to chromatography.

4.2.d. Pipet 3.5 ml of each $M_w$ standard into respectively labeled duplicate test tubes. Set controller for the number of injections.

4.2.e. Determine the median average volume of elution ($V_e$) for both standards.

4.2.f. Calculate $K_{av}$ of each standard:
Kav=(Ve−Vo)/(Vt−Vo) Where:
Ve=elution volume
Vo=void volume (total exclusion from gel pore)
Vo=(Vt-0.33)
Vt=Total column volume of packed gel
Kav=Fraction of stationary gel volume which is available for diffusion of the solute species at any time.
Vt=$\pi r^2 h$
r=radius of inner dimension of column
h=height of packing in the column.

4.2.g. Prepare a graph so that the X-axis is equal to the log $M_w$ of the standards, and the Y-axis is equal to Kav. Plot the standards' Kav onto the graph and draw a best-fit curve intersecting both standard points, or Enter data as above into a programmed calculator or computer for "linear regression".

4.3 Sample Molecular Weight Average Determination 4.3.a. If analyte contains 0.80-1.2% HA, weight 0.48-0.52 gm of sample into a 20 ml volumetric flask. Dilute to the mark with mobile phase (a 1:40 dilution).

4.3.b. If analyte contains less than 0.80% HA, weigh 0.78-0.82 gm sample into a 20 ml volumetric flask. Dilute to the mark with mobile phase (a 1:25 dilution).

4.3.c. If analyte contains 1.2-2.0% HA, weigh 0.31-0.35 gm sample into a 20 ml volumetric flask. Dilute to the mark with mobile phase (a 1:60 dilution).

4.3.d. Follow conditions as related above for instrument set up. Inject 1000 μl of 0.2μ filtered samples using the same instrument conditions as for standardization.

4.3.e. Determine Ve for each injection. Calculte Kav as above.

4.3.f. Plot (or enter) sample Kav. Determine corresponding log Mw value from the X-axis. Determine the anti-log to find the numerical molecular weight average.

5.0 Validity of Results 5.1 Standards—standard values are valid if Ve for thyroglobulin is 1.25-1.39 ml/cc of gel. Ve for the first peak of Blue Dextran is 0.82-0.90 ml/cc of gel (the second peak is a smaller $M_w$ fraction than 2,000,000).

5.2 Samples—Results are valid if sample Ve falls within the standard curve.

5.3 Results are valid if Kav for standard/or samples is less than 1.0 but greater than 0.0.

5.4 Results are valid if the analyte concentration is within 0.20 mg/ml-0.30 mg/ml range (or a shift could occur).

6.0 Note

The standard curve should be repeated every 30 days with fresh reagents unless changes in system parameters warrant more frequent evaluation, e.g. gel compaction or a new column.

Formula For PBS-P Mobile Phase

Add:
8.5 gm NaCl
0.223 gm $Na_2HPO_4$ (anhydrous)*
0.04 gm $NaH_2PO_4 \cdot H_2O$
to a 1000 ml volumetric flask, dilute to the mark with distilled deionized water. Mix well. Filter through 0.22μ Filter prior to use. Is stable for 15 days at room temperature if kept in a sterile environment.

*0.28 gm of $Na_2HPO_4$ (dihydrate) may be substituted if necessary.

For Table 1 the batches were heated at a constant temperature of about 60° C. for 7 to 20 days in an open vessel. Using this preferred treatment the viscosity drops significantly (e.g. 4475 to 134 for batch 1) while the molecular weight remains the same. All peaks are identical indicating that even small variations or shifts in molecular weight patterns are not produced by heat.

The data shown in Table 2 were obtained by heating three aliquots of the same 1% solution of sodium hyaluronate (NaH) for a constant time period but using temperatures between 30° C. and 50° C. It is evident that the viscosity of such a polymer solution can even be lowered by long-term storage at 30° C. (318 down to 298). Increasing temperature to 50° C. for the same time period produced a greater drop in viscosity (i.e. 318 down to 175). Again the molecular weight was not affected.

The effect of high temperature on viscosity of NaH is shown in Table 3. A solution of 1.1% NaH was autoclaved (121° C. at 15 pounds pressure) for 30 minutes. It was then reautoclaved for 30 minutes. It is evident from Table 3 that the viscosity was lowered considerably by these short-term high temperature treatments without affecting the molecular weight.

The heat treatment has been found to be effective over a wide range of conditions depending somewhat on the viscosity of the starting material. A particularly advantageous range is between about 7 and 20 days at between about 55° and 80° C. in an open vessel. The viscosity reduction appears to be inhibited if the heat treatment is conducted in a closed vessel.

Filtration Method: The use of filtration techniques to reduce viscosity is dependent upon pore size, flow rate, and number of actual filtrations. The technique should be applied to HA solutions of about one weight percent or more because at more dilute concentrations the molecules are not sufficiently complexed to suffer a configurational modification on passing through the filter pores. At such concentrations the viscosity is high enough to require special steps to effect filtration such as high pressures or vacuums and higher filter area to solution volume ratios. The smaller the pore size (such as <0.5μ) and the higher the pressure or vacuum the lower will be viscosity. In addition, viscosity is reduced in a direct relation to the number of filtrations. Table 4 demonstrates this effect of filtration. Cellulose nitrate filters were used with 5-10 inches of Hg vacuum. Again viscosity is lowered without affecting molecular weight. It is felt that any filter matrix material would be acceptable for this purpose.

It should be noted that HA or NaH is normally very difficult to filter sterilize through a 0.22 membrane filter. Even HA or NaH which has been brought to pH 11 to reduce viscosity, as described earlier cannot pass through such filters readily. However, we have discovered that either our heating or our filtration process produce HA or NaH which easily passes through a 0.22μ filter allowing it to be sterilized as a final formulation. It is theorized that both of our discovered methods of viscosity reduction change the molecular conformation similar to that which is seen with an increase in pH. The initially rigid α-helix structure of high viscosity NaH or HA is relaxed as the interresidue bonds are broken by heat or filtration. In both our methods, however, the viscosity reduction is not reversible by simply lowering temperature or pH as is seen with the change in viscosity produced by changes in pH.

Both the methods described herein allow production of high molecular weight, low viscosity HA which is terminally filter sterilizable. The preferred method of production is outlined in Example I.

The invention is further illustrated, but is not intended to be limited by the following examples in which all parts and percentages are by weight unless otherwise specified.

EXAMPLES

EXAMPLE I

1. Obtain a solution containing approximately 0.5% or higher concentration of HA (as such or as a salt, preferably of K or Na) from the bacterial fermentation source as described in commonly owned copending patent application Ser. No. 555,224 or any other source (i.e. rooster combs, umbilical cords, etc.). Bacterial source HA is preferred.
2. Set up winder apparatus so that the HA solution can be fed into 95% ethanol in a tank while the winder is mixing the ethanol.
3. Add HA to ethanol while winder is mixing at a slow to moderate speed.
4. Continue winding until approximately 30 minutes after the last of the HA solution has been added.
5. Drain ethanol from tank having precipitated HA wound on winder cage.
6. Fill tank with water for injection (WFI). Start winder and continue running at a slow speed until all HA is dissolved.
7. Repeat steps 2-6 until desired purity and molecular weight or viscosity have been obtained.
8. In order to reduce viscosity and maintain high molecular weight and a narrow molecular weight range heat treatment is used.
   a. Place the purified HA or NaH solution at approximately 1.2% HA into a jacketed container with a mixer capable of stirring a highly viscous solution.
   b. Preferably control the heat between 55° C. and 65° C.
   c. As evaporation occurs, water for injection (WFI) is added back as needed to maintain the original volume.
   d. The viscosity is monitored until it reaches or drops below a predetermined level, preferably below 150 c/s.
9. After heat treatment the HA material is of low viscosity, high molecular weight, narrow molecular weight range, and has ultra high purity. The material is also stable to light and heat.
10. In order to prepare final product the HA material described in 9. is sterilized. This is preferably accomplished by sterile filtration through a 0.22μ filter. Heat sterilization can also be used.

Product obtained from following the procedure of this Example was repeatedly tested after long-term exposure to light at room temperature (several months) and after long-term exposure to temperatures of at least 50° C. (12 months). Molecular weight and % AI were stable after these treatments.

This product was also found to be antigen free by both analytical testing and in vivo evaluation. Hyperimmunization of both horses and rabbits failed to develop antibodies detectable by the Western Transblot electrophoresis technique. Three intramuscular injections of a 1 weight percent aqueous buffered solution were made at seven day intervals using 0.5 ml injections for the rabbit and 2.0 ml injections for the horse. The Arthus Phenomenon Like Skin Reaction Test involving the hyperimmunization of a rabbit, followed by injection of a macrophage sensitive dye in an ear vein and subsequent intraperitoneal injection of this HA also gave a negative indication, i.e. no immune reaction. The injection of 2 milliters of a 1 weight percent buffered aqueous solution of the sodium salt into either the tibiotarsal or radialcarpal joint of a horse failed to provoke an immune reaction as evaluated by post injection swelling (compared to that from the injection of buffered solvent alone).

In order to illustrate the results of the described procedures a fourth commercial size batch of HA was analyzed throughout the process for molecular weight and viscosity. The measurements are listed in Table 5. It should be noted that all samples contained between 9.0 and 10.0 mg/ml of HA dissolved in WFI. Molecular weight and viscosity increase as a result of the winding but viscosity alone decreases after the heat treatment. Therefore, the resulting product is of high molecular weight and low viscosity.

If a high molecular weight, high viscosity product is desired the heat treatment step can be omitted. β-propiolactone or gamma ray sterilization can be used.

Using the preferred method, a product with the specifications listed in Table 6 can be produced. This table compares the claimed product with commercially available product from Pharmacia and Sterivet. This verifies the uniqueness of its product characteristics.

TABLE 1

EFFECT OF HEAT ON VISCOSITY OF NaH INDICATING LACK OF EFFECT ON MOLECULAR WEIGHT

| HA BATCH | Viscosity (C/S) Before Heat | MW Before Heat | Viscosity (C/S) After Heat | Days of Heat Treat. | MW After Heat |
|---|---|---|---|---|---|
| 1 | 4475 | $2.0 \times 10^6$ | 134 | 9 | $1.8 \times 10^6$ |
| 2 | 924 | $1.7 \times 10^6$ | 68 | 7 | $1.8 \times 10^6$ |
| 3 | 1382 | $1.9 \times 10^6$ | 185 | 20[1] | $1.8 \times 10^6$ |

[1]initial treatment was in a closed vessel

TABLE 2

EFFECT OF LONG-TERM LOW HEAT TREATMENT ON VISCOSITY OF A SOLUTION OF NaH

| SAMPLE TREATMENT | VISCOSITY CENTISTOKES[2] | MOLECULAR WEIGHT |
|---|---|---|
| NONE | 318 | $1.1 \times 10^6$ |
| 30° C. 1 month | 298 | $1.2 \times 10^6$ |
| 40° C. 1 month | 248 | $1.1 \times 10^6$ |
| 50° C. 1 month | 175 | $1.1 \times 10^6$ |

[2]material not subjected to "winding" process

TABLE 3

EFFECT OF HIGH TEMPERATURE ON VISCOSITY OF A SOLUTION OF NaH

| SAMPLE TREATMENT | VISCOSITY CENTISTOKES | MOLECULAR WEIGHT |
|---|---|---|
| NONE | 4475 | $1.7 \times 10^6$ |
| 121° C. 30 minutes | 454 | $1.8 \times 10^6$ |
| 121° C. 60 minutes | 96 | $1.8 \times 10^6$ |

TABLE 4

EFFECT OF FILTRATION ON VISCOSITY

| TREATMENT | VISCOSITY | MOLECULAR WEIGHT |
|---|---|---|
| None | 1226 | $1.1 \times 10^6$ |
| Vacuum Filtration (1.0 Filter) | 998 | $1.1 \times 10^6$ |
| Vacuum Filtration (0.45 Filter) | 542 | $1.1 \times 10^6$ |
| Vacuum Filtration (0.22 Filter) | 279 | $1.1 \times 10^6$ |

TABLE 5

VALIDATION OF MOLECULAR WEIGHT AND VISCOSITY OF BATCH 4 THROUGHOUT THREE WINDING STEPS AND ONE HEAT TREATMENT

| STEP OF PROCESS | MOLECULAR WEIGHT ($\times 10^6$ daltons) | VISCOSITY[1] (C/S) |
|---|---|---|
| Post 1st Winding | 1.2 | 65 |
| Post 2nd Winding | 1.9 | 170 |
| Post 3rd Winding | 2.0 | 1126 |
| Post Heat Treatment- Final Product | 2.0 | 90 |

[1]viscosities for the post windings but not the post heat treatment were of a 0.5 weight per cent aqueous 37° C. solution.

TABLE 6

COMPARISON OF BAYVET PRODUCT WITH COMMERCIALLY-AVAILABLE PRODUCT FROM PHARMACIA AND STERIVET

| PARAMETER TESTED | BAYVET PRODUCT | PHARMACIA | STERIVET |
|---|---|---|---|
| % Al | 0.9-1.1 | 0.99 | 0.93 |
| AV. MOL. WT. ($\times 10^6$ daltons) | >1.8 | 1.9 | 1.1 |
| MOL. WT. RANGE ($\times 10^6$ daltons) | 1.8-3.5 | | |
| VISCOSITY (C/S) | <150 | >1000 | 15 |
| AMINO ACIDS (mg/ml) | <0.1 | 0.38 | 0.47 |
| NUCLEIC ACIDS (ug/ml) | <5.0 | 53.8 | 6.0 |
| LIGHT STABILITY | YES | NO | ? |
| HEAT STABILITY | YES | NO | ? |
| FILTER STERILIZED | YES | NO | NO |

Given the above Examples, it is thought that numerous variations will occur to those skilled in the art. Accordingly, it is intended that the above Example should be considered illustrative only and that the invention disclosed herein should be limited only by the following claims.

What is claimed is:

1. An essentially pure light and heat stable hyaluronic acid or a salt thereof having an average molecular weight of at least about 1,200,000 daltons by FPLC, a nucleic acid content of less than 45 micrograms per milliliter as determined by UV absorbance, an irreversible viscosity of less than about 500 centistokes in a 1 weight percent 37° C. aqueous solution of the sodium salt and the capability of being filter sterilized through a 0.22 micron filter.

2. The hyaluronic acid of claim 1 wherein the molecular weight is at least about 1.8 million daltons.

3. The hyaluronic acid of claims 1 or 2 wherein the viscosity is less than about 150 centistokes.

4. A light and heat stable hyaluronic acid or a salt thereof having the following characteristics:
   a) an average molecular weight as determined by FPLC of at least about $1.2 \times 10^6$ daltons;
   b) a molecular weight distribution which gives an essentially single symmetrical FPLC distribution peak with at least 98% of the material having a weight between about $1.2 \times 10^6$ and $4.0 \times 10^6$;
   c) a viscosity in a 1 weight percent aqueous solution as the sodium salt at 37° C. of less than about 500 centistokes;
   d) an ability to be filter sterilized using a 0.22 micron pore size filter;
   e) a protein content of less than about 1.25 mg/ml and a nucleic acid content of less than 45 micrograms per milliliter by UV absorbance; and
   f) a lack of substantial immune reaction when 2 milliliters of a 1 weight percent aqueous solution of the sodium salt is injected into either a tibiotarsal or radialcarpal joint of a horse as evaluated by post injection swelling.

5. The hyaluronic acid of claim 4 wherein the viscosity is less than about 250 centistokes.

6. The hyaluronic acid of claim 4 or 5 wherein the molecular weight distribution has been narrowed by precipitating it into a bath of a liquid medium in which hyaluronic acid will precipitate in which there is a continuously moving device to which the precipitating hyaluronic acid can adhere.

7. The hyaluronic acid of claim 6 obtained when the moving device is rotating about an axis within the bath.

8. The hyaluronic acid of claim 7 obtained when the moving device comprises rotating "fingers" and the bath comprises mainly ethanol.

9. The hyaluronic acid of claim 8 obtained when the axis of rotation is essentially vertical.

10. The hyaluronic acid of claim 6 wherein the average FPLC determined molecular weight is at least about $1.8 \times 10^6$ daltons.

11. A process for preparing a composition comprising hyaluronic acid or a salt thereof, the method comprising the steps of
   a) obtaining hyaluronic acid or a salt thereof from a source selected from the group consisting of fermentation, rooster combs, or umbilical cords;
   b) precipitating the HA using a special winder in order to increase molecular weight to at least about 1,800,000;
   c) heating the product of step b) at a temperature of from about 50 to about 120 degrees Celsius under conditions sufficient to irreversibly lower the viscosity below about 500 centistokes without substantially lowering the molecular weight and without resulting in caramelization or hydrolysis.

12. The process of claim 11 wherein the product is heated to at least 50° C.

13. The process of claim 11 or 12 wherein the heating step is for at least about 72 hours.

14. The process of claim 11 wherein the molecular weight of step b) is at least about 2,500,000, heating is at a temperature of at least 50° C. for at least 72 hours and under conditions sufficient to reduce the viscosity to less than about 150 centistokes.

15. A process of preparing a composition comprising hyaluronic acid or a salt thereof, the method comprising the steps of
   a) obtaining hyaluronic acid or a salt thereof from hyaluronic acid containing source,
   b) precipitating the HA product of a) using a special winder in order to increase molecular weight to at least about 1,800,000,
   c) filtering the product of step b) through a filter having an average pore size of about 1 micron or less under conditions sufficient to assure a viscosity of less than about 500 centistokes.

16. The process of claim 15 wherein the filter of step b) has an average pore size of less than about 0.5μ.

17. The process of claim 16 wherein the filter has an average pore size of less than about 0.25μ.

18. The hyaluronic acid of claims 1 or 4 which will not invoke an immune reaction according to either electrophoresis or the rabbit sensitization test.

19. A process for narrowing the molecular weight distribution and enhancing the average molecular weight of hyaluronic acid or a salt thereof comprising precipitating it into a bath of a liquid medium in which hyaluronic acid will precipitate containing a continuously moving device to which the precipitating material can adhere wherein the precipitated material is redissolved and treated to reduce its viscosity to less than about 500 centistokes measured at a room temperature as 1 weight percent aqueous solution of the sodium salt by heating the redissolved material to a temperature of from about 50 to about 120 degrees Celsius or by forcing an at least 1 weight percent solution of the redissolved material through a filter having an average pore size of about 1 micron or less.

20. The process of claim 19 wherein the reduction in viscosity is effected by heating between about 50° and 120° C.

21. The process of claim 19 wherein the reduction in viscosity is effected by forcing an at least about 1 weight percent solution through a filter with an average pore size of about 1 micron or less.

22. A process for reducing the viscosity of high molecular weight hyaluronic acid or a salt thereof comprising heating a solution of such a material having a FPLC determined molecular weight of at least about $1.1 \times 10^6$ daltons and a 37° C. viscosity as a 1 weight percent aqueous solution of the sodium salt in excess of about 500 centistokes at a temperature of from about 55 to about 80° C. for from about 7 to about 20 days in an open vessel to lower the viscosity without substantially affecting the molecular weight.

23. A process for reducing the viscosity of a high molecular weight hyaluronic acid or a salt thereof comprising forcing an at least 1 weight percent solution of such a material having a FPLC determined molecular weight of at least about $1.1 \times 10^6$ daltons and a 37° C. viscosity as a 1 weight percent aqueous solution of the sodium salt in excess of about 500 centistokes through a filter having a pore size of about one micron or less.

* * * * *